(12) United States Patent
Wu (10) Patent No.: US 9,083,865 B2
(45) Date of Patent: Jul. 14, 2015

(54) INFRARED CAMERA WITH ROTATABLE CORE ASSEMBLY

(75) Inventor: Jiping Wu, Guangzhou (CN)

(73) Assignee: Guangzhou SAT Infrared Technology Co., Ltd., Guangzhou (CN)

( * ) Notice: Subject to any disclaimer, the term of this patent is extended or adjusted under 35 U.S.C. 154(b) by 522 days.

(21) Appl. No.: 13/103,282

(22) Filed: May 9, 2011

(65) Prior Publication Data

US 2012/0057027 A1    Mar. 8, 2012

(30) Foreign Application Priority Data

Sep. 6, 2010  (CN) .......................... 2010 1 0274664
Feb. 7, 2011  (EP) ..................................... 11153558

(51) Int. Cl.
| H04N 5/33 | (2006.01) |
| H04N 5/225 | (2006.01) |
| G03B 13/02 | (2006.01) |
| G03B 17/02 | (2006.01) |

(52) U.S. Cl.
CPC .............. *H04N 5/2251* (2013.01); *G03B 13/02* (2013.01); *G03B 17/02* (2013.01); *H04N 5/33* (2013.01)

(58) Field of Classification Search
CPC ........... A63F 13/00; A63F 13/10; H04N 5/23; H04N 13/43; H04N 5/33
USPC .................. 248/125.8; 250/353; 348/78, 164; 370/402; 382/103
See application file for complete search history.

(56) References Cited

U.S. PATENT DOCUMENTS

| 6,265,984 B1* | 7/2001 | Molinaroli ................. 340/815.4 |
| 2005/0276448 A1* | 12/2005 | Pryor ............................. 382/103 |
| 2006/0289768 A1* | 12/2006 | Vallese et al. .................. 250/353 |
| 2008/0156946 A1* | 7/2008 | Schmutzer et al. ........ 248/125.8 |
| 2010/0172362 A1* | 7/2010 | Zhou et al. ..................... 370/402 |
| 2012/0229617 A1* | 9/2012 | Yates et al. ...................... 348/78 |

\* cited by examiner

*Primary Examiner* — Y Lee
*Assistant Examiner* — Salame Amr
(74) *Attorney, Agent, or Firm* — Fish & Tsang LLP (57) ABSTRACT

An infrared camera with a rotatable core assembly, the infrared camera having; a main body including a body shell and a signal processor installed in the body shell; a core assembly including a core assembly housing, an infrared lens provided at the front end of the core assembly housing, and a sensing unit installed in the core assembly housing; a handle connected to the main body; and a LCD display used to display a picture and rotatably installed on one side of the main body, wherein the core assembly is rotatably connected to the front end of the body shell. The infrared camera according to the present application can switch its shooting modes among horizontal type, gun type and upright type according to the requirements of the observation by a user.

11 Claims, 6 Drawing Sheets

INFRARED CAMERA WITH ROTATABLE CORE ASSEMBLY

CROSS-REFERENCE TO RELATED APPLICATIONS

The present application claims the benefit of foreign priority under 35 U.S.C. §119 based upon Chinese Patent Application, CN 201010274664.9, filed on Sep. 6, 2010, the whole of which is hereby incorporated by reference; and, European Patent Application, EP 11153558.9, filed on Feb. 7, 2011, the whole of which is hereby incorporated by reference.

FIELD OF THE INVENTION

The present invention relates to an infrared camera, especially to an infrared camera operating with multiple shooting modes or multiple capturing modes, which is applicable to the field of industrial detection.

BACKGROUND

Conventionally, the infrared detection technology has been gradually widely used in industrial or civil application fields, such as products manufacturing, products or facilities disposing, fixing, inspection and maintenance, to get infrared thermal images for objects or check up the position or working state of a specific article or object. The infrared detection technology is used, for example, to detect hollows or bulges, defects, tile shedding, dampness and thermal bridge, etc. in architecture industry, to search for fire sources, to determine the cause of an accident or to find the injured in smoke in fire protection field, to find the person hiding in the night in public security system, to detect running performances of the tires, and to check up the characters of heating wires in air conditioner, engine and exhaust pipes in automobile production field, to detect the efficacies of acupunctures, and to get early diagnosis of a nasopharyngeal cancer, breast cancer and other diseases in medical treatments, and to check up the wires, connectors, fast closing brakes, transformer cabinets, etc. in the power system. The infrared cameras used in those circumstances usually need to provide a plurality of shooting modes in accordance with different environments or different objects to be detected.

The so-called shooting mode of the infrared camera is mainly determined by the relative position relationship or relative angle relationship between the infrared lens and the body of the camera. As in different shooting modes, the observation position and the observation angle between the observer and the camera, as well as the relative position and relative angle between the camera and the object to be detected, are all different from each other. In general, the shooting modes of the infrared camera can be divided into horizontal type, upright type, gun type and camera type, etc.

The shooting mode of any one of the conventional Infrared cameras, no matter what kind of Infrared camera it belongs to, tends to be monotonous and can't be switched from one into another, thus the conventional Infrared camera is only applicable for one kind of thermal image photographing in one certain application or in one specific environment, not available in different applications or environments.

In addition, in view of requirements for different circumstances of shooting and detecting, the demands for multifunction of the infrared cameras are continually increasing, for example, some of the infrared cameras need have infrared and visual light photographing functions at the same time, some of the infrared cameras need to be of strong internal data processing functions, and some of them need provide functions such as voice communication, video playing and Internet accessing. Whether it's reasonable for the addition and configuration of those functional members also cause a lot of problems to be solved on the structure design, function implementation and the operation reliability of the infrared cameras.

SUMMARY OF THE INVENTION

In order to solve the above problems in the prior art, an object of the present application is to provide an infrared camera with a rotatable core assembly, which can switch its shooting modes among horizontal type, upright type and gun type by rotating the core assembly, so that it can be used by a user to photograph thermal images of the objects to be detected according to different applications and different environments.

Another object of the present application is to provide an infrared camera with a rotatable core assembly, which can achieve integration of multifunction such as infrared imaging, visual light imaging, Bluetooth wireless communication and audio/video storage and playing.

To achieve the above objects, the present application provides an infrared camera with a rotatable core assembly, while the infrared camera comprising: a main body including a body shell and a signal processor installed in the body shell; a core assembly including a core assembly housing, an infrared lens provided at the front end of the core assembly housing, and a sensing unit installed in the core assembly housing; a handle provided over the top of the main body and connected thereto; and a LCD display used to display a picture and rotatably installed on one side of the main body, wherein the core assembly is rotatably connected to the front end of the body shell.

The core assembly according to the present embodiment further comprises: a first rotating mechanism provided on one side of the core assembly housing by which the core assembly rotates relatively to the main body, such that the infrared camera switches its shooting modes among horizontal type, upright type and gun type.

Wherein the core assembly according to the present embodiment is detachably connected to the main body via the first rotating mechanism.

Wherein the first rotating mechanism according to the present embodiment comprises: a shaft base provided on one side the core assembly near the LCD display; a shaft fixed on the shaft base; and a brake gasket collared on the shaft.

The main body according to the present embodiment further comprises: a fitting part for the first rotating mechanism provided at the front end of the body shell of the main body and used to fit in with the first rotating mechanism, while the fitting part for the first rotating mechanism comprises: an extending arm provided at the front end of the main body on one side near the LCD display and extending from the front end of the main body; a via hole of the extending arm provide on the extending arm; a brake gasket; a corrugated pad; and a locknut; wherein the shaft passing through the brake gasket, the via hole of the extending arm, another brake gasket and the corrugated pad is locked up by the locknut.

The infrared camera according to the present embodiment further comprises: a viewfinder including a viewfinder body; and a second rotating mechanism provided at the front end of the viewfinder body, wherein the viewfinder body is rotatably and hideably connected to the rear end of the core assembly housing of the core assembly via the second rotating mechanism.

The second rotating mechanism according to the present embodiment comprises: two rotating arms, separated apart from each other, provided respectively at the front end of the viewfinder body and extended therefrom; two via holes of the rotating arms each provided on one of the two rotating arms respectively; two bolts; and two dishing springs, wherein each bolt passing through one of the dishing springs inserts into one of the two via holes of the rotating arms.

The core assembly according to the present embodiment further comprises: a fitting part for the second rotating mechanism provided at the rear end of the core assembly housing of the core assembly and used to fit in with the second rotating mechanism, while the fitting part for the second rotating mechanism comprises: a U groove, having a U cavity surrounded by two side walls, one bottom surface and one back wall to receive the viewfinder, provided at the rear end of the core assembly housing of the core assembly; a hinge block provided on the back wall of the U groove near the top of the back wall at its central axis; and two via holes of the hinge block provided on two sides of the hinge block, wherein each of the bolts passing through one dishing spring and one via hole of the rotating arm respectively inserts into one of the via holes of the hinge block of the fitting part for the second rotating mechanism to be fixed respectively.

The viewfinder body of the viewfinder according to the present embodiment, when the infrared camera operates in a shooting mode of upright type, is rotated out of the core assembly housing to extrude over there via the second rotating mechanism.

The viewfinder body of the viewfinder according to the present embodiment, when the infrared camera operates in a shooting mode of horizontal type or gun type, is rotated into the U cavity of the core assembly housing to be hidden via the second rotating mechanism.

The core assembly according to the present embodiment further comprises: a visual light lens provided at the front end of the core assembly housing right over the infrared lens; a laser indicator provided at the front end of the core assembly housing on one side of the infrared lens; and a lamp provided at the front end of the core assembly housing on another side of the infrared lens.

Wherein the handle according to the present embodiment is provided on the top surface of the main body, there is a keypad part including a plurality of keys for control provided at the front end of the handle.

Wherein the LCD display according to the present embodiment has a third rotating mechanism provided thereon to cause the screen of the LCD display rotates relatively to the main body, while a fitting part for the third rotating mechanism is provided on the main body on the side where the LCD display is fixed and used to fit in with the third rotating mechanism.

The infrared camera according to the present embodiment comprises a plurality of electric functional modules for implementing functions of infrared imaging, visual light imaging, storing and outputting of the vocal information and video information.

Wherein the plurality of electric functional modules according to the present embodiment comprise: a lamp control circuit, a vocal control circuit and a video control circuit installed within the body shell of the main body; and the internet online interface and a Bluetooth interface provided at the rear end of the body shell of the main body, wherein the lamp is connected to the signal processor via the lamp control circuit, the keypad part is connected to the signal processor via the vocal control circuit, the video control circuit and the lamp control circuit, etc. respectively, and the signal processor is connected to the internet or the communication devices via the internet online interface and the Bluetooth interface respectively.

The aspects of the present application described as above have advantages that the infrared camera can switch its shooting modes such as from horizontal type to gun type, from gun type to upright type, and vice versa, by the rotatable core assembly, therefore facilitating the user to photograph the thermal images of the object to be detected according to different application or different environment.

In addition, the infrared camera with a rotatable core assembly according to the present application can achieve integration of multifunction of infrared imaging, visual light imaging, Bluetooth wireless communication and audio/video storing and playing, etc., and can achieve high operational stability and reliability.

Wherein the reference signs are explained as below:
1—main body
  11—body shell
  12—signal processor
  13—fitting part for the first rotating mechanism
    131—extending arm
    132—via hole of the extending arm
    133—brake gasket
    134—corrugated pad
    135—locknut
  14—fitting part for the third rotating mechanism
2—core assembly
  21—core assembly housing
  22—infrared lens
  23—sensing unit
  24—the first rotating mechanism
    241—shaft base
    242—shaft
    243—brake gasket
  25—fitting part for the second rotating mechanism
    251—U groove
    252—hinge block
    253—via hole of the hinge block
  26—Visual light lens
  27—laser indicator
  28—lamp
3—handle
  31—keypad part 4—LCD display
    41—the third rotating mechanism
5—viewfinder
    51—viewfinder body
    52—the second rotating mechanism
        521—rotating arm
        522—via hole of the rotating arm
        523—bolt
        524—dishing springs

DETAILED DESCRIPTION OF THE PREFERRED EMBODIMENTS

The foregoing and other objects, aspects and advantages of the present invention will become more apparent from the following detailed description of the present application when taken in conjunction with the preferred embodiments and accompanying drawings. The embodiments here are only used to illustrate but not to limit the present application.

Figure 1:
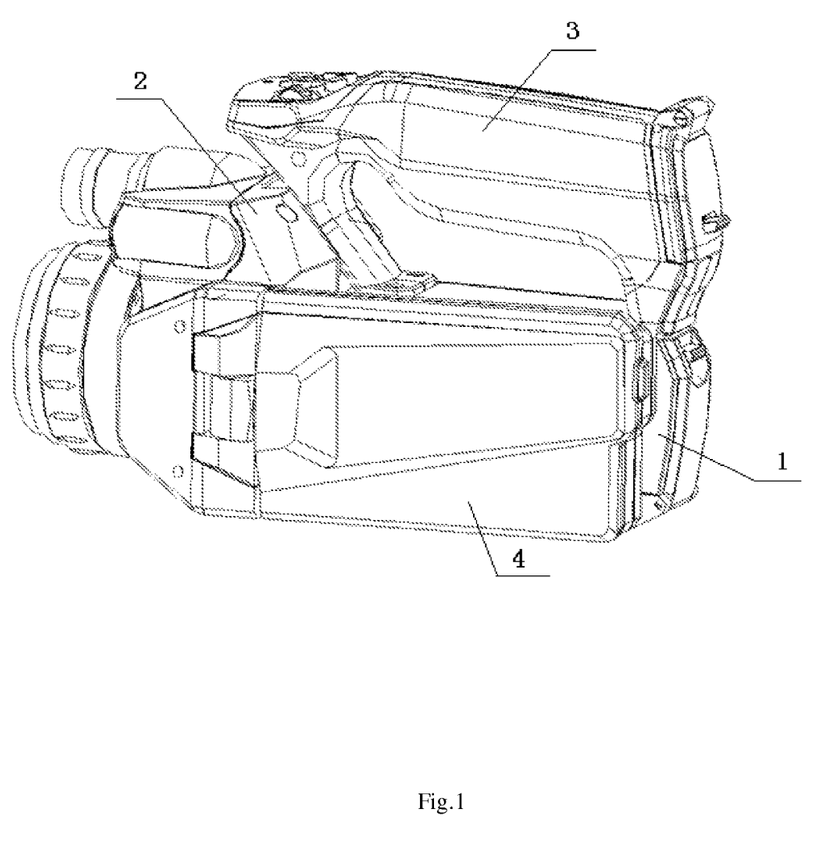
FIG. 1 is a perspective view showing the structure of the infrared camera with a rotatable core assembly according to the present application in its shooting mode of horizontal type.

FIG. 1 is a perspective view showing the structure of the infrared camera with a rotatable core assembly according to the present application in its shooting mode of horizontal type.

Hereafter, the description on orientation related to respective parts of the infrared camera are all based on the position of the infrared camera viewed in its shooting mode of horizontal type shown in FIG. 1, where the direction of the position of the infrared lens is regarded as the front side or front end, and the direction of the position of the handle is regarded as upside or the top end. For example, as that described later, "the front end of the body shell 11" means the end on the body shell 11 facing the infrared lens 22 of the core assembly 2 when the infrared camera is in a shooting mode of horizontal type, and "the top portion of the core assembly housing 21" means the portion on the topmost of the core assembly housing 21 when the infrared camera is in its shooting mode of horizontal type.

Referring to FIG. 1, the infrared camera according to the present embodiment comprises: a main body 1 including a body shell 11 and a signal processor 12 installed in the body shell 11; a core assembly 2 including a core assembly housing 21, an infrared lens 22 provided at the front end of the core assembly housing 21, and a sensing unit 23 installed in the core assembly housing 21; a handle 3 provided on the top of the main body 1 and connected thereto; and a LCD display 4 used to display a picture and rotatably installed on one side of the main body 1, wherein the core assembly 2 is connected to the front end of the body shell 11 and may be detachable and rotatable relatively to the main body 1.

The infrared lens 22 in the core assembly 2 according to the present embodiment is a kind of detachable lens with incorporated function of automatically and manually focusing for receiving the infrared light. The sensing unit 23 is a kind of uncooled infrared detector for transforming the infrared light signal received by the infrared lens 22 into an electric signal. The sensing unit 23 in the present embodiment can be implemented with a resolution of 640×480.

Figure 4:
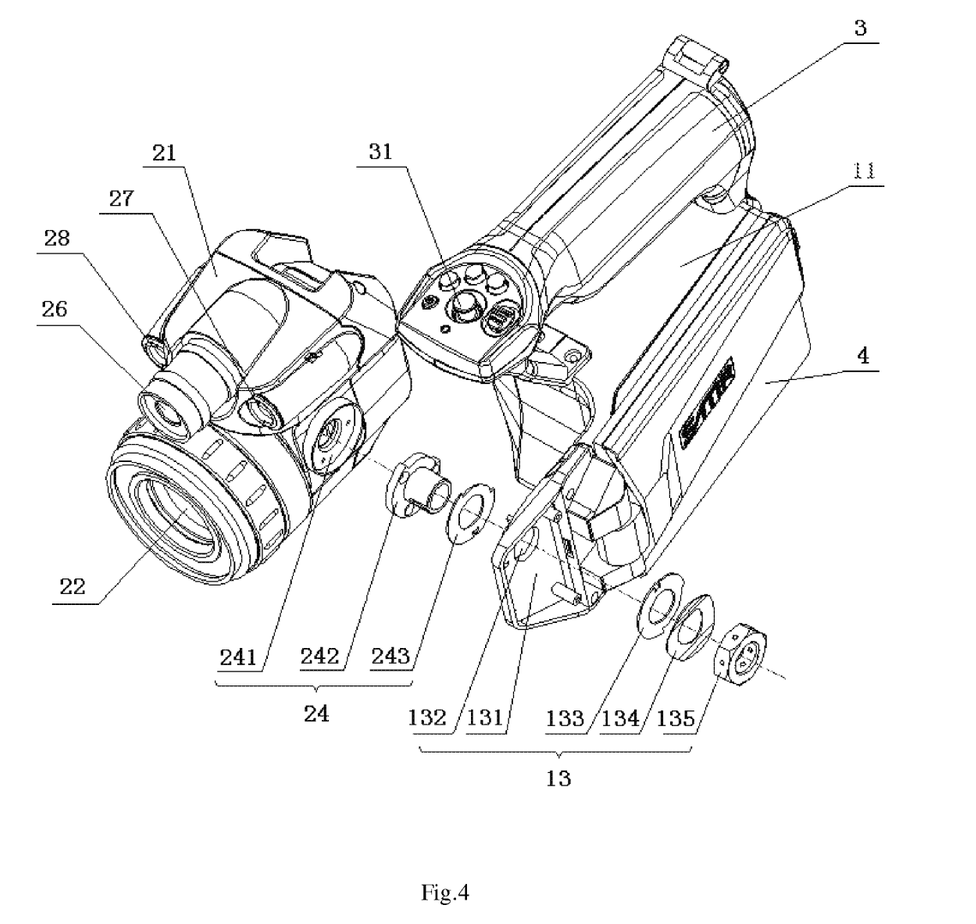
FIG. 4 is an exploded perspective view showing the matching parts of the core assembly and the main body of the infrared camera.

FIG. 4 is an exploded perspective view showing the matching parts of the core assembly and the main body of the infrared camera. As shown in FIG. 4, the core assembly 2 comprises a first rotating mechanism 24 provided on one side of the core assembly housing 21 by which the core assembly 2 rotates relatively to the main body 1, such that the infrared camera switches its shooting mode among horizontal type, upright type and gun type.

The first rotating mechanism 24 comprises: a shaft base 241 provided on the core assembly 2 on one side near the LCD display 4; a shaft 242 fixed on the shaft base 241 by a plurality of bolts; and a brake gasket 243 collared on the shaft 242.

In addition, the core assembly 2 further comprises: a visual light lens 26, a laser indicator 27 and a lamp 28 which are used for many complex functions of photographing, referring to FIG. 4. For example, there may be very possibly a requirement for a visual light photographing simultaneously or separately, according to the practice of the actual application, to form a visual light image of an object to be photographed so as to gain more accurate and intuitive observation or detection when combining the visual image and the infrared image of the object together. Moreover, the laser indicator 27 is used for indicating or orientating with respect to the object to be photographed if necessary, and the lamp 27 is used for auxiliary illumination when there has insufficiency light in the environment.

Wherein the visual light lens 26 is provided at the front end of the core assembly housing 21 right over the infrared lens 22; the laser indicator 27 is provided at the front end of the core assembly housing 21 on one side of the infrared lens 22; and the lamp 28 is provided at the front end of the core assembly housing 21 on another side of the infrared lens 22.

The signal processor 12 in the main body 1 of the present embodiment is used for treatments such as A/D transforming and NUC processing on electric signals and then to transform the electric signals into video signals to be output. Since the infrared lens 22 of the core assembly 2 receives infrared lights which are invisible for human eyes, and the infrared signals are transformed into electric signals by the sensing unit 23, the signal processor 12 in the main body 1 is to process those electric signals as described above and then transform them into optic signals usable in videos and/or images to be displayed on the LCD display 4.

As shown in FIG. 4, the body shell 11 of the main body 1 is also provided thereon with the fitting part 13 for the first rotating mechanism used to fit in with the first rotating mechanism 24 and provided at the front end of the body shell 11 of the main body 1.

The fitting part 13 for the first rotating mechanism comprises: an extending arm 131 provided at the front end of the main body 1 on one side near the LCD display 4 and extending from the front end of the main body 1; a via hole 132 of the extending arm provide on the extending arm 131; a brake gasket 133; a corrugated pad 134; and a locknut 135, wherein the shaft 242 passing through the brake gasket 243, the via hole 132 of the extending arm, another brake gasket 133 and the corrugated pad 134 is locked up tightly by the locknut 135.

The handle 3 according to the present embodiment is a kind of handset in shape of gunstock, which may be referred as a gun-type handle. The handle 3 is provided on the top surface of the main body 1. A keypad part 31 including a plurality of keys for control to execute a plurality of functions is provided at the front end of the handle 3. The plurality of keys include, for example, key of the power ON/OFF of the infrared camera, button of voice recording, button of video start/finish, etc. The user can control the infrared camera simply by operating the keypad part 31 while holding the handle 3 with a single hand, which is very convenient for user's usage.

The handle 3 also has a rechargeable battery provided in its shell for providing the power supply to the infrared camera to maintain its normal operation.

Figure 3:
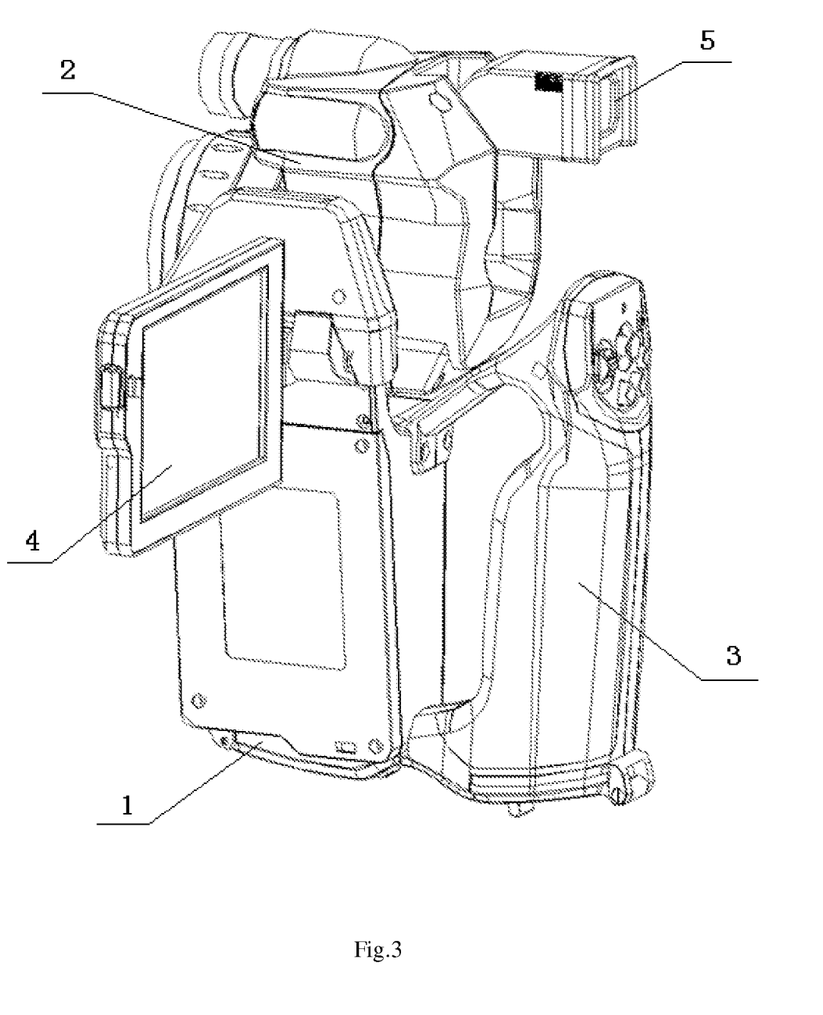
FIG. 3 is a perspective view showing the structure of the infrared camera with a rotatable core assembly according to the present application in its shooting mode of upright type.

The viewfinder 5 according to the present embodiment is able to be hidden, which comprises: a viewfinder body 51; and a second rotating mechanism 52 provided at a lower end of the viewfinder body 51. The description here on orientation of the viewfinder 5 is based on the position of the viewfinder 5 in its open state (i.e. the operating state) shown in FIG. 3, wherein the direction of the position of the infrared lens 22 is considered as the front side or the front end.

Wherein the viewfinder body 51 is connected to the rear end of the core assembly housing 21 of the core assembly 2 via the second rotating mechanism 52, and the second rotating mechanism 52 causes the viewfinder body 51 rotates relatively to the core assembly 2 together with the fitting part 25 for the second rotating mechanism provided at the rear end of the core assembly housing 21 of the core assembly 2, through this rotating, the viewfinder body 51 may either extrude out of the fitting part 25 for the second rotating mechanism of the core assembly 2 to facility the observer's observation or view-finding, or be hidden within the fitting part 25 for the second rotating mechanism to constitute a more compact structure so as to improve the flexibility and agility of the infrared camera in switching among different shooting modes.

Figure 5:
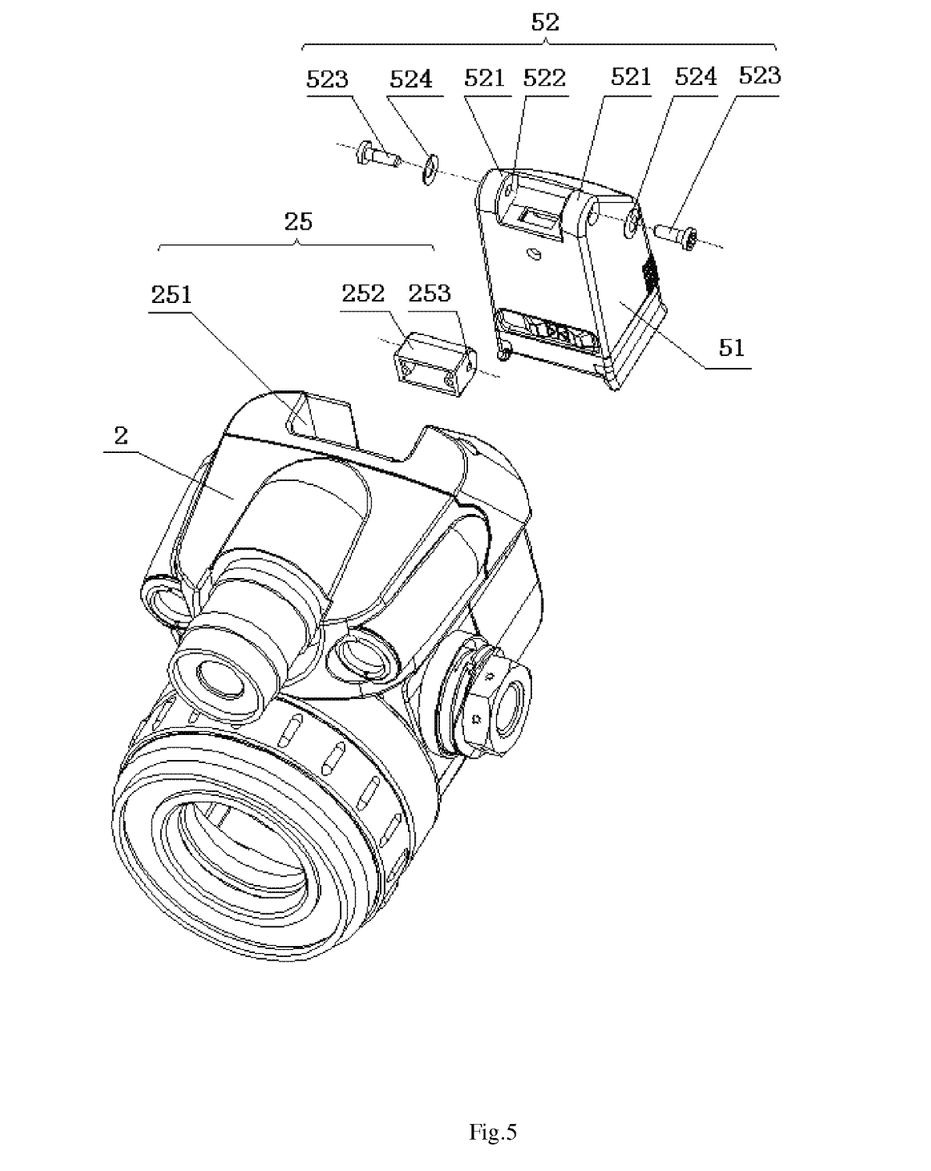
FIG. 5 is an exploded perspective view showing the matching parts of the core assembly and the viewfinder of the infrared camera.

FIG. 5 is an exploded perspective view showing the matching parts of the core assembly and the viewfinder of the infrared camera. The second rotating mechanism 52, as shown in FIG. 5, comprises: two rotating arms 521, separated apart from each other with a certain distance, provided respectively at the front end of the viewfinder body 51 and extended therefrom; two via holes 522 of the rotating arms each provided on one of the rotating arms 521 respectively; two bolts 523; and two dishing springs 524, wherein each bolt 523 passing through one of the dishing springs 524 inserts into one of the two via holes 522 of the rotating arms.

In order to fit in with the second rotating mechanism, the core assembly 2 further comprises a fitting part 25 for the second rotating mechanism provided at the rear end of the core assembly housing 21 of the core assembly 2.

Wherein the fitting part 25 for the second rotating mechanism comprises: a U groove 251, having a U cavity surrounded by two side walls, one bottom surface and one back wall to receive the viewfinder 5, provided at the rear end of the core assembly housing 21 of the core assembly 2; a hinge block 252 provided on the back wall of the U groove 251 near the top of the back wall at its central axis; and two via holes 253 of the hinge block provided on two sides of the hinge block 252, wherein each bolt 523 passing through one dishing spring 524 and one via hole 522 of the rotating arm respectively inserts into one of the via holes 253 of the hinge block of the fitting part 25 for the second rotating mechanism to be fixed respectively.

The explanation to the rotating procedure of the viewfinder 5 as well as the open and hiding manner thereof will now be described in detail as below.

Firstly, the two bolts 523 passing through the respective dishing springs 524 and the via holes 522 of the rotating arm insert into via holes 253 of the hinge block of the fitting part 25 for the second rotating mechanism to be fixed respectively, thereby the viewfinder 5 is pressed tightly to the hinge block 252 by means of the spring force of the dishing springs 524.

Then, the viewfinder body 51 may rotates upwards (in anticlockwise direction) relatively about the shaft set on the hinge block 252 for a 0-135° rotation via the rotating arm 521 of the second rotating mechanism 52 until it's fully opened. The viewfinder body 51 having been fully opened stop rotation while withstood to the back wall of the fitting part 25 for the second rotating mechanism, where the viewfinder body 51 is maintained in an open state.

While in the open state shown in FIG. 3, if the viewfinder body 51 is rotated reversely (in clockwise direction) until it's totally hidden within the U groove 252 of the core assembly 2, the viewfinder 5 hereby is maintained in a hidden state. At this moment the LCD display 4 may be opened in order to execute observation or view-finding.

The viewfinder 5 can be holdup or stabilized at any angle in its 0-135° forwards or backwards rotation.

In particular, when the infrared camera is in its shooting mode of upright type shown in FIG. 3, the viewfinder body 51 of the viewfinder 5 rotates out of and extrudes over the core assembly housing 21 via the second rotating mechanism 52, where the viewfinder 5 is in a usable state. Observing scenery by the viewfinder 5 is more convenient and more intuitive compared with the situation when finding scenery and observing by the LCD display 4, which is more clear than the display screen of the LCD display 4 especially when encountered with extreme weathers of raining and fogging, thundering or in ice storm, thus the observing may not be affected by bad weathers, and the LCD display 4 now is protected from corrupted caused by wind, frost and rain when having been closed up while using the viewfinder 5 directly for observing.

Figure 2:
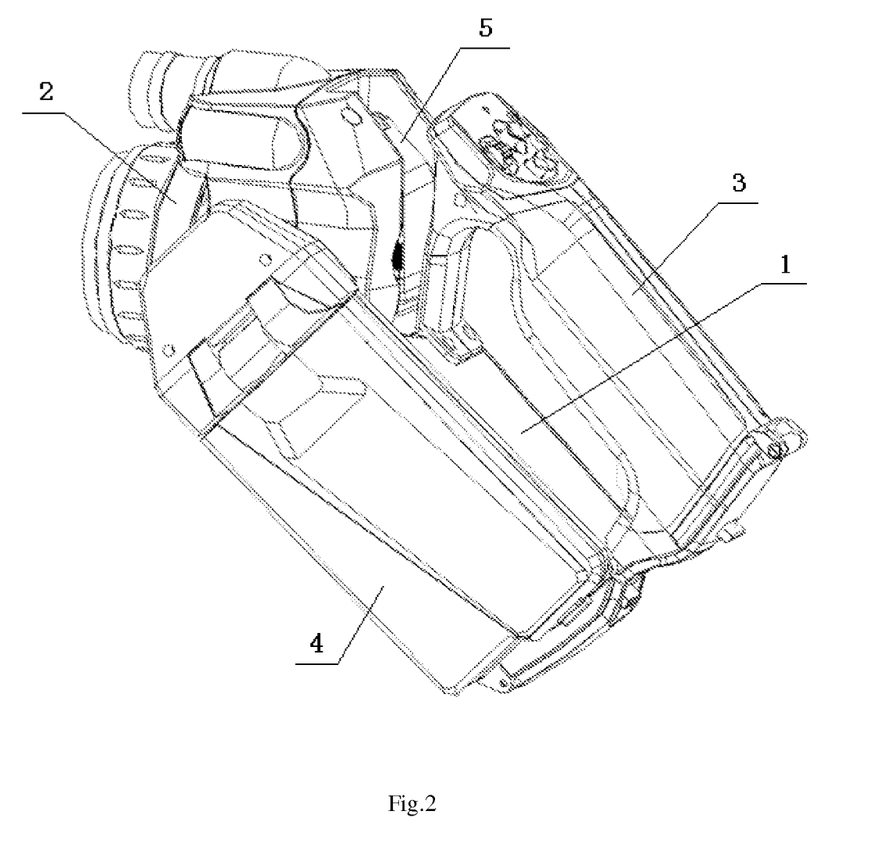
FIG. 2 is a perspective view showing the structure of the infrared camera with a rotatable core assembly according to the present application in its shooting mode of gun type.

When the infrared camera is to be turned into a shooting mode of horizontal type or gun type, the viewfinder body 51 of the viewfinder 5 has been rotated into the core assembly housing 21 to be hidden via the second rotating mechanism 52. Thereby the core assembly 2 is able to be rotated conveniently and has a free rotation which may not be affected by the viewfinder 5 extruding out of the core assembly 2.

As shown in FIG. 3, the LCD display 4 according to the present embodiment is provided thereon with the third rotating mechanism 41 causing the LCD display 4 rotates relatively to the main body 1, while the main body 1 is provided on the side where fixing the LCD display 4 with a fitting part 14 for the third rotating mechanism, which is used to fit in with the third rotating mechanism 41. Both the fitting part 14 for the third rotating mechanism and the third rotating mechanism 41 can be selected from any of those conventional fitting members or mechanisms.

The rotating of the LCD display 4 includes a horizontal rotation outwards from one side of the main body 1 about the first axis in parallel with the principal axis of the main body 1, such that the LCD display 4 is in a displaying position shown in FIG. 3.

The LCD display 4, having rotated to the position shown in FIG. 3, may further vertically rotates to a certain angle about the second axis which is vertical to the first axis, such that the screen of the LCD display 4 can be adjusted via this vertically rotation for always facing the observer to facilitate his/her observation, when there is a angle existed between the main body 1 and the observer's sightline as the infrared camera, for example, is in its shooting mode of gun type.

The switching procedure of the infrared camera between different shooting modes will now be described in detail as below.

FIGS. 1 to 3 are perspective views showing respectively the structure of the infrared camera with a rotatable core assembly according to the present application in its shooting modes of horizontal type, upright type and gun type.

Firstly, the shaft 243 is fixed to the shaft base 241 on the core assembly housing 21 by three bolts such that the shaft 243 is kept immovable to the core assembly 2. The shaft 243 extending from one side of the core assembly 2 passing through the brake gasket 243, the via hole 132 of the extending arm of the fitting part 13 for the first rotating mechanism, corrugated pad 134 and the brake gasket 133 is locked up by the locknut 135, hereby the core assembly 2 is connected to the main body 1 of the infrared camera.

Since the corrugated pad 134 tightly pressed by the locknut 135 can produce frictional force, by which the core assembly 2 is able to be holdup or stabilized at any angle in its 0-90° rotation relative to the main body 1.

Secondly, the body shell 11 has an anchor point convex on the side wall thereof, such that the core assembly 2 can stop upon a 90° rotation relative to the main body 1.

The core assembly 2 in a shooting mode of horizontal type shown in FIG. 1 may rotates upwards (in anticlockwise direction) via the first rotating mechanism 24, with constantly rotating the angle between the principle axis of the core assembly 2 (i.e. the principle axis of the infrared lens 22) and the extending direction of the main body 1 is gradually increasing until reaching a certain angle between 0-90°, where the infrared camera in a shooting mode of horizontal type shown in FIG. 1 is switched into that in a shooting mode of gun type shown in FIG. 2.

The core assembly 2 in a shooting mode of gun type shown in FIG. 2 may further rotates anticlockwise via the first rotating mechanism 24 so that the angle between the principle axis of the core assembly 2 and the extending direction of the main body 1 is further gradually increasing until reaching a certain angle of 90° between the principle axis of the core assembly 2 and the extending direction of the main body 1, where the infrared camera in a shooting mode of gun type shown in FIG. 2 is switched into that in a shooting mode of upright type shown in FIG. 3.

If the core assembly 2 in a shooting mode of upright type shown in FIG. 3 rotates reversely (in clockwise direction), the infrared camera can switch its shooting modes from upright type to gun type and then to horizontal type.

It can be known from the above described aspects that the infrared camera can arbitrarily switch its shooting modes among horizontal type, gun type and upright type by rotating the core assembly 2, thus providing conveniences for the user to observe the objects to be detected in different position under different environment.

Figure 6:
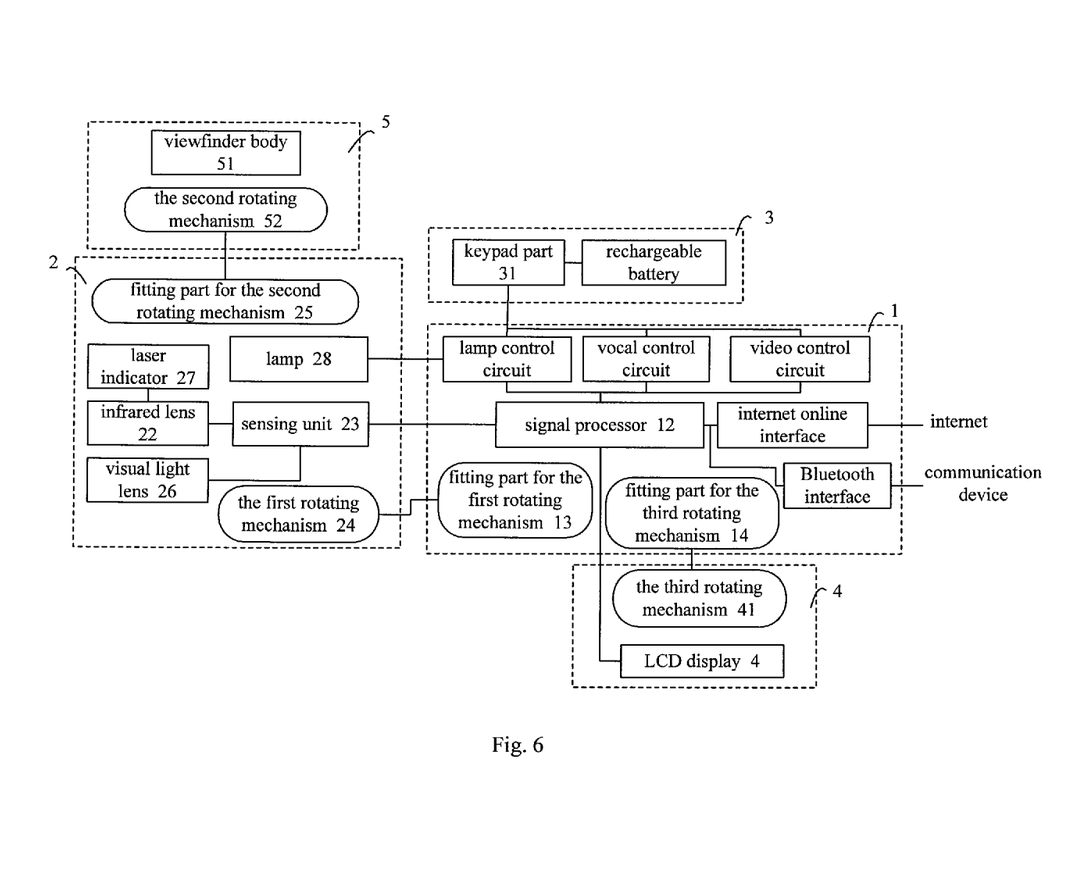
FIG. 6 is a functional flowchart of the infrared camera according to the present application.

FIG. 6 is a functional flowchart of the infrared camera according to the present application. The infrared camera according to the present application comprises a plurality of electric functional modules for implementing functions of infrared imaging, visual light imaging, storing and outputting of the vocal information and video information, etc. For example, the plurality of electric functional modules may comprise: a lamp control circuit, a vocal control circuit and a video control circuit provided within the body shell 11 of the main body 1; and the internet online interface and a Bluetooth interface provided at the rear end of the body shell 11 of the main body 1, wherein the lamp 27 is connected to the signal processor 12 via the lamp control circuit, the keypad part 31 is connected to the signal processor 12 via the lamp control circuit, the vocal control circuit and the video control circuit, etc. respectively, and the signal processor 12 is connected to the internet or the communication devices via the internet online interface and the Bluetooth interface respectively.

The infrared camera integrated together with multifunction according to the present application refers to a great deal of electric functional modules, thus it's necessary to reasonably arrange those functional modules' positions and structures within different parts (including such as the main body 1, the core assembly 2, the handle 3, the LCD display 4 and the viewfinder 5) of the infrared camera to achieve high stability in their physical and electric connection.

It can be known from the above described aspects that the infrared camera with a rotatable core assembly according to the present application can be integrated with multifunction of infrared imaging, visual light imaging, Bluetooth wireless communication and audio/video storing and playing, etc., and can achieve high operational stability and reliability.

Although embodiments have been described with reference to a number of illustrative embodiments thereof, it should be understood that numerous other modifications and embodiments can be devised by those skilled in the art that will fall within the spirit and scope of the principles of embodiments. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An infrared camera with a rotatable core assembly, while the infrared camera comprising:
    a main body including a signal processor;
    a core assembly including an infrared lens, a sensing unit comprising an infrared detector, and a fitting part having a U groove including a U cavity surrounded by first and second side walls;
    a LCD display used to display a picture and rotatably installed on one side of the main body; and
    a first rotating mechanism by which the core assembly rotates relatively to the main body, such that the infrared camera switches its shooting modes among horizontal type, upright type and gun type;
    a second rotating mechanism coupled with the fitting part and rotatably coupled to the core assembly;
    a viewfinder including a viewfinder body; and
    a mechanism that rotates the viewfinder body into the U cavity when the infrared camera operates in the shooting mode of the horizontal type or the gun type,
        wherein in the horizontal type shooting mode the angle between the principle axis of the infrared lens and an extending direction of the main body is 0°, and further wherein from the horizontal type shooting mode the core assembly is rotatable via the first rotating mechanism in an anticlockwise direction until reaching an angle of 0° to 90° between the principle axis of the infrared lens and the extending direction of the main body in the gun type shooting mode, and further wherein from the gun type shooting mode the core assembly is further rotatable via the first rotating mechanism in an anticlockwise direction until reaching an angle of 90° between the principle axis of the infrared lens and the extending direction of the main body in the upright type shooting mode,
        wherein the core assembly can be holdup or stabilized at any angle in its 0° to 90° rotation relative to the main body, and
        wherein the second rotating mechanism comprises: first and second rotating arms;
    two via holes of the rotating arms each provided on one of the rotating arms respectively;
    two bolts; and
    two dishing springs, wherein each bolt passing through one of the dishing springs inserts into one of the two via holes of the rotating arms.

2. The infrared camera with a rotatable core assembly according to claim 1, wherein the core assembly is detachably coupled to the main body via the first rotating mechanism.

3. The infrared camera with a rotatable core assembly according to claim 1, wherein the first rotating mechanism comprises:
    a shaft fixed on the shaft base; and
    a brake gasket collared on the shaft.

4. The infrared camera with a rotatable core assembly according to claim 3, wherein the main body further comprises:
   a fitting part for the first rotating mechanism having
      an extending arm provided at the front end of the main body on one side near the LCD display and extending from the front end of the main body.

5. The infrared camera with a rotatable core assembly according to claim 1, wherein the core assembly further comprises:
   a hinge block provided on a wall of the U groove; and
   two via holes of the hinge block provided on two sides of the hinge block, wherein each bolt passing through one dishing spring and one via hole of the rotating arm respectively inserts into one of the via holes of the hinge block of the fitting part for the second rotating mechanism to be fixed respectively.

6. The infrared camera with a rotatable core assembly according to claim 1, having a mechanism that rotates the viewfinder body out of the core assembly when the infrared camera operates in the shooting mode of the upright type out of the core assembly.

7. The infrared camera with a rotatable core assembly according to claim 1, wherein the core assembly further comprises:
   a visual light lens provided at a front end of the core assembly housing disposed over the infrared lens;
   a laser indicator provided at the front end of the core assembly housing on one side of the infrared lens; and
   a lamp provided at the front end of the core assembly housing on another side of the infrared lens.

8. The infrared camera with a rotatable core assembly according to claim 1, further comprising a handle disposed on a top surface of the main body, and having a keypad part with a plurality of keys.

9. The infrared camera with a rotatable core assembly according to claim 1, wherein the LCD display has a second rotating mechanism disposed to cause the screen of the LCD display to rotate relative to the main body.

10. The infrared camera with a rotatable core assembly according to claim 1, wherein the infrared camera comprises a plurality of electric functional modules that implement functions of infrared imaging, visual light imaging, storing and outputting of vocal information and video information.

11. The infrared camera with a rotatable core assembly according to claim 10, wherein the plurality of electric functional modules comprise:
   a lamp control circuit, a vocal control circuit and a video control circuit provided within a body shell of the main body; and
   an internet online interface and a Bluetooth interface provided at a rear end of the body shell, wherein the lamp is connected to the signal processor via the lamp control circuit;
   the keypad part is electrically coupled to the signal processor via the vocal control circuit, the video control circuit and the lamp control circuit respectively; and
   the signal processor is electrically coupled to the internet or the communication devices via the internet online interface and the Bluetooth interface respectively.

\* \* \* \* \*